3,425,517
AUTOMATIC WHEEL CHOCK
Charles D. Speir, 753 Betty Lane, Hurst, Tex. 76053
Filed Nov. 22, 1967, Ser. No. 685,132
U.S. Cl. 188—32                                    1 Claim
Int. Cl. B60t 3/00

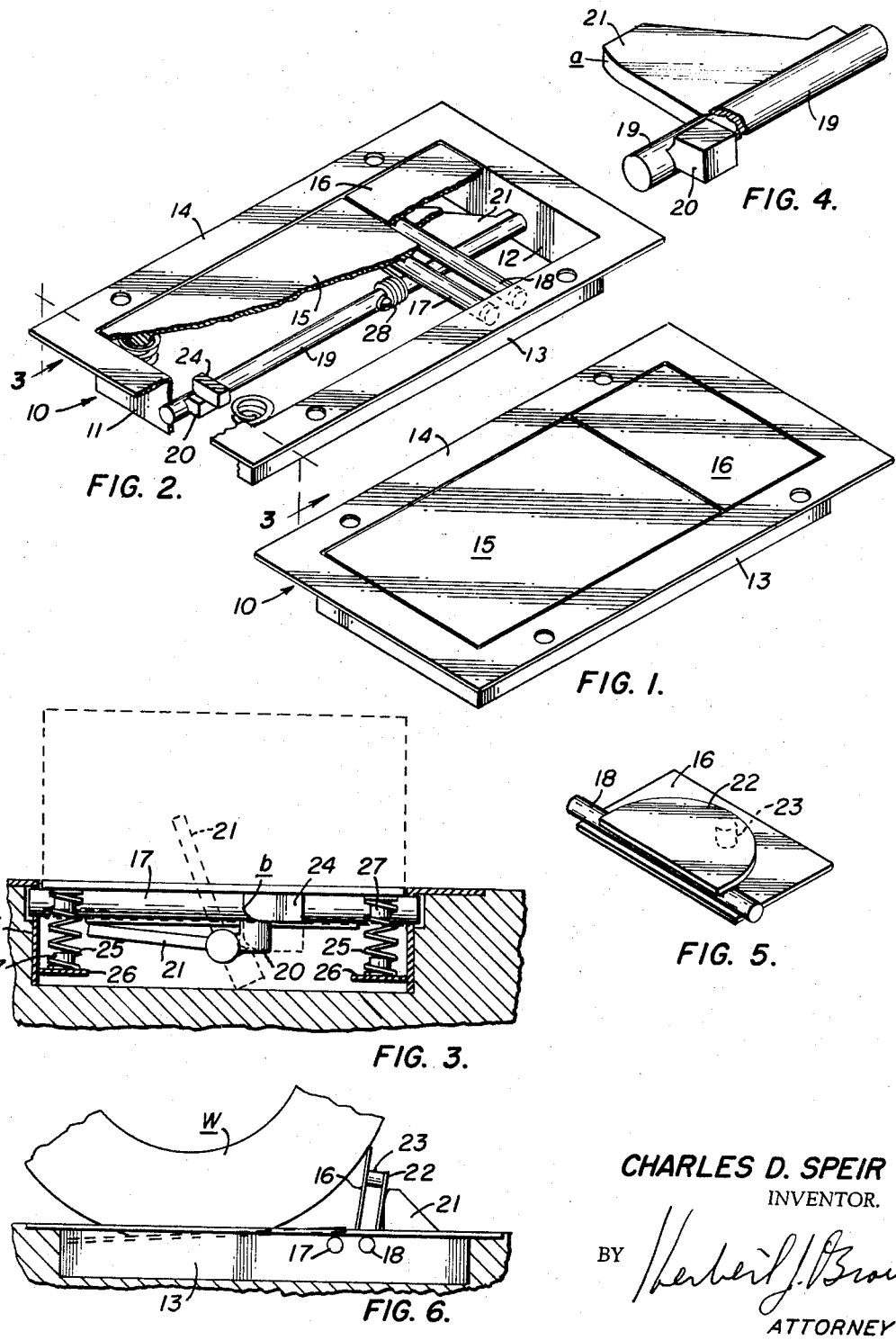

ABSTRACT OF THE DISCLOSURE

An automatic wheel stopping device for installation in the floor of a garage, car port, or the like, and primarily comprised of a rectangular frame, an operating plate and a stopping plate, each hingedly mounted in the frame on transverse axes inwardly of the ends of the frame, a longitudinal shaft beneath the two plates, a cam on the bottom of the operating plate making contact with a lug on the shaft and a chock plate on the shaft beneath the stopping plate. When a vehicle wheel rolls onto the operating plate the shaft is rotated and, in turn, the chock plate is rotated and makes contact with and raises the stopping plate.

---

This invention relates to an automobile wheel stopping device and has reference to a mechanism for installation in the floor of a garage, car port or the like.

Locating the distance between the front of an automobile and a garage wall has always been a problem to many drivers. Heretofore, projecting immovable chocks on the garage floor have been used for the described purpose, but these created somewhat of a hazard in that they were subject to being stumbled over. Other means for locating an automobile had to do with overlying hinged plates wherein the weight of the approaching wheel on the first plate caused the second plate to tilt and serve as a stop. This construction was objectionable in that the action was slow and it was possible for the wheel to roll entirely over the device if the automobile were moving faster than a given maximum speed. Also, such devices were objectionable in that the tilted plates were not well braced against the rolling action of the automobile wheel.

An object of the invention is to provide a vehicle wheel stopping device such as referred to and having a quick action which assures the tilting of the stopping plate before the wheel can roll over it.

Another object is to provide automatic bracing means behind the upper portion of the tilted stopping plate.

These and other objects of the invention will become apparent from the following description and the accompanying drawing, in which:

FIGURE 1 is a perspective view of a wheel stopping device in accordance with the invention and is shown in its closed position.

FIGURE 2 is a view similar to FIGURE 1, but is shown with parts broken away to illustrate the inner mechanism.

FIGURE 3 is a sectional view taken on line 3—3 of FIGURE 2 showing the device embedded in a portion of a garage floor.

FIGURE 4 is a broken contracted perspective view of the longitudinal shaft, the laterally projecting lug on the forward end of the shaft and the oppositely projecting chock plate on the rear end of the shaft.

FIGURE 5 is an inverted perspective view of the stopping plate, its supporting hinge rod and the bearing plate for coaction with the chock plate, and FIGURE 6 is a side elevational view of the device embedded in a section of floor and showing a wheel rolled on the device.

In the drawing the numeral 10 generally designates a rectangular frame having front and rear walls 11, 12, side walls 13 and a horizontal flange 14 around the upper edges of all of the said walls. Flush with the flange 14 there is an operating plate 15 in the forward portion of the frame 10 and a stopping plate 16 in the rear portion of the frame. It is to be noted that the operating plate is longer than the stopping plate 16. The adjoining edges of the plates 15 and 16 are supported, as by welding, on transverse hinge rods 17 and 18, the ends of which are journaled in the frame side walls 13. Extending along the longitudinal center of the frame 10, and journaled in the front and rear walls 11 and 12, there is an operating shaft 19. There is a normally horizontal laterally projecting lug 20 on the shaft near its forward end and an oppositely directed chock plate 21 on the shaft just rearwardly of the stopping plate hinge rod 18. Beneath the stopping plate 16 and parallel therewith an arcuate bearing plate 22 having a straight edge is secured to the hinge rod 18 and a spacer 23 is provided between the two plates. As best shown in FIGURE 4, the chock plate 21 is generally in the form of right triangle with a straight edge thereof projecting from the shaft 19 near the second hinge rod 18. The extending portion of $a$ of the last referred to straight edge is curved where, in operation, it makes sliding contact with the bearing plate 22.

A cam 24 is secured to the lower surface of the operating plate 16 where it makes contact with the lug 20 on the operating shaft 19. The cam 24 is curved, at $b$, around its inner lower corner where it makes sliding contact with the lug 20 during the operation of the device.

The forward portion of the operating plate 15 is supported on coiled springs 25 in the front corners of the frame 10. As best shown in FIGURE 3, the lower ends of the springs 25 are supported on plates 26 projecting inwardly from the frame side walls 13. Short cylindrical locators 27 on the lower surface of the operating plate 15 and on the upper surfaces of the last described projecting plates 26 are received in the ends of the springs 25 to prevent lateral displacement of the latter. As shown only in FIGURE 2, there is a return spring 28 coiled around the shaft 19. One end of the spring 28 is secured to the shaft, whereas the remaining and laterally extending end of the spring makes contact with the lower surface of the operating plate 15 near the first hinge rod 17. The action of the spring 28 is such that it urges the chock plate 22 to assume a normally horizontal position.

In operation, when a wheel W of a vehicle rolls onto the operating plate 15 the latter is depressed, causing the cam 24 to press the lug 20 on the shaft 19 downwardly. This action causes the chock plate 21 to rise and tilt the stopping plate 16 upwardly to a somewhat vertical but inclined position. In this position the chock plate 21 also serves as a brace for the stopping plate 16. When the wheel W backs off of the operating plate 15 the coiled springs 25 raise the plate and the return spring 28 around the shaft 19 causes the chock plate 21 to assume its horizontal position. The weight of the stopping plate 16 causes the same to fall to its first described position flush with the flange 14 of the frame 10, and the coiled springs 25 in the front of the frame 10 raise the operating plate 15 to its flush position.

What is claimed is:

1. An automatic wheel stopping device for installation in a floor and comprised of a frame having front, rear wall and side walls, an operating plate in the front of said frame and normally flush with the upper edges thereof, a stopping plate in the rear portion of said frame and normally flush with the upper edges thereof, transverse hinge rods rotatably supported by the sides of said frame and respectively positioned beneath and secured to the opposing edges of said operating and stopping plates, an operating shaft rotatably supported by the front and rear walls of said frame and positioned beneath said operating and stopping plates, a normally horizontal laterally projecting lug on said shaft beneath said operating plate, a projection on the bottom of said operating plate positioned to contact said lug, a chock plate on said shaft beneath said stopping plate and projecting from the shaft in a direction opposite said lug, the size of said chock plate being sufficient to contact and raise said stopping plate when said shaft is rotated and means returning said operating, stopping and chock plates to their normal positions when weight is removed from said operating plate.

References Cited

UNITED STATES PATENTS 2,661,817 12/1953 Mullins _____ 188—32
3,077,247 2/1963 West et al. _____ 188—111

FERGUS S. MIDDLETON, *Primary Examiner.*

T. W. BUCKMAN, *Assistant Examiner.*